United States Patent [19]

Hashizume et al.

[11] Patent Number: 5,417,378
[45] Date of Patent: May 23, 1995

[54] TAPE CASSETTE

[75] Inventors: Kenji Hashizume, Miyotamachi; Masatoshi Okamura, Saku; Hiroshi Kaneda, Saku; Motohiko Shima, Saku, all of Japan

[73] Assignee: TDK Corporation, Tokyo, Japan

[21] Appl. No.: 171,199

[22] Filed: Dec. 21, 1993

Related U.S. Application Data

[63] Continuation of Ser. No. 777,154, Oct. 16, 1991, abandoned.

[30] Foreign Application Priority Data

Oct. 17, 1990 [JP] Japan ................. 2-276193

[51] Int. Cl.⁶ .......................................... G11B 23/087
[52] U.S. Cl. .......................................... 242/343.2
[58] Field of Search ............... 242/197, 198, 199, 200, 242/343.2; 360/132

[56] References Cited

U.S. PATENT DOCUMENTS

| | | | |
|---|---|---|---|
| 4,607,307 | 8/1986 | Sieben | 360/132 |
| 4,685,638 | 8/1987 | Satoyoshi et al. | 242/199 |
| 4,874,143 | 10/1989 | Armstrong et al. | 242/198 |
| 4,918,558 | 4/1990 | Igarashi et al. | 242/199 X |
| 4,974,108 | 11/1990 | Bordignon | 242/199 X |

FOREIGN PATENT DOCUMENTS

| | | |
|---|---|---|
| 0169514 | 1/1986 | European Pat. Off. |
| 0169514 | 11/1987 | European Pat. Off. |
| 2020628 | 11/1979 | United Kingdom |
| 2099400 | 12/1982 | United Kingdom |

Primary Examiner—Daniel P. Stodola
Assistant Examiner—John P. Darling
Attorney, Agent, or Firm—Price, Gess & Ubell

[57] ABSTRACT

A tape cassette capable of satisfactorily exhibiting a stable braking function sufficient to prevent tape looseness during non-use of the tape cassette. A release lever is vertically movably arranged in a casing and downwardly forced by a coiled spring. Reel brakes each have a operating cam section against the release lever to be operatively associated therewith. Thus, a release pin provided on a side of a deck for driving or operating the tape cassette is upwardly abutted against a lower surface of the release lever.

15 Claims, 5 Drawing Sheets

TAPE CASSETTE

This is a continuation of application Ser. No. 07/777,154, filed on Oct. 16, 1991, for a TAPE CASSETTE, now abandoned.

BACKGROUND OF THE INVENTION

1. Field of the Invention

This invention relates a magnetic tape cassette for recording and reproducing a digital signal, and more particularly to a tape cassette such as a video tape cassette, an 8 mm tape cassette or the like which has a tape wound on reels.

2. Description of the Related Art

There has been widely used a magnetic tape cassette for a PCM recording and reproducing apparatus which is adapted to convert an analog signal such as an acoustic signal or the like to a digital signal such as a PCM signal to record it on a magnetic tape or reproduce the recorded signal from the tape. The magnetic tape cassette used for such a purpose is provided with a brake mechanism including brake members or reel brakes. The brake members function to regulate revolution of a pair of reels which have a magnetic tape wound thereon, to thereby prevent looseness of the magnetic tape in non-use of the tape cassette. In use of the tape cassette, the reel brakes are kept released from engagement with the reels by means of a release means arranged on the side of a tape deck for driving or operating the tape cassette, so that the reels may be rotated.

Also, in the brake mechanism of the conventional tape cassette, the brake members each are supported on a shaft provided in a cassette casing or the like and a release lever arranged in a cassette casing is actuated through the release means of the deck while being forced by means of a spring, so that the release lever functions to selectively carry out engagement of the brake members with the reels and release of the brake members from engagement with the reels.

Unfortunately, the conventional tape cassette causes an area for setting the brake mechanism to be substantially reduced because it is arranged between both reels so as to be positioned opposite to the center of a front lid of the cassette casing, resulting in failing to permit the rotational displacement of the reel brakes or brake members due to movement of the release lever in the setting area to be carried out. This causes a reduction of rotational movement of the brake members, resulting in the braking action being rendered unstable, so that the brake mechanism fails to exhibit a satisfactory braking function.

Also, in the prior art, the reel brakes are caused to continue rotation or pivotal movement while the release lever is moving while contacting with the reel brakes, so that an area necessary for the brake release operation larger than that necessary for movement of the reel brakes is required in addition to the latter area.

SUMMARY OF THE INVENTION

The present invention has been made in view of the foregoing disadvantage of the prior art.

Accordingly, it is an object of the present invention to provide a tape cassette which is capable of stably and safely controlling the driving of a tape.

It is another object of the present invention to provide a tape cassette which is capable of satisfactorily exhibiting a stable braking function sufficient to prevent looseness of a tape in a non-use mode of the tape cassette.

It is a further object of the present invention to include a brake mechanism capable of stably exhibiting a function of braking a tape in a non-use mode of the tape cassette even when it is arranged in a narrow area or region of the cassette.

It is still another object of the present invention to provide a tape cassette which is capable of being readily assembled and manufactured.

In accordance with the present invention, a tape cassette is provided which includes a casing, and a pair of reels rotatably arranged in the casing and having a tape wound thereon so as to extend therebetween. The reels each are formed with teeth. The tape cassette also includes reel brakes pivotally arranged in the casing and associated with the teeth of the reels to regulate rotation of the reels. The reel brakes one each formed at one end thereof with an operating cam section. The tape cassette further includes a release member vertically movably arranged in the casing and resiliently forced downward, against which the operating cam sections are pressed so as to be operatively associated with the release member, so that a release pin provided on the side of a deck for operating the tape cassette is upwardly abutted against the release member.

In a preferred embodiment of the present invention, a guide means is arranged in the casing for guiding vertical movement of the release member.

In a preferred embodiment, the operating cam sections each comprise a rib formed on the reel brake so as to vertically extend therefrom.

In a preferred embodiment of the present invention, the rib includes an outer side end engaged with the release member and the outer side end or edge comprises a slanting portion formed so as to downwardly inwardly slant and a vertically extending portion connected to the slanting portion.

The release member may be constructed so as to include a surface section against which an upper end of the release pin is abutted, a plurality of guide ribs provided on an outer periphery thereof in a manner to radially extend, and a cylindrical section, wherein the guide ribs are engaged with the guide means to permit the release member to vertically move along the guide means and the cylindrical section has a coiled spring fitted therein so as to force the release member toward the surface section.

In a preferred embodiment of the present invention, the guide means comprises grooves provided in the casing. The grooves each may be defined by a wall member. Alternatively, the guide means may comprise rods provided in the casing.

The tape cassette of the present invention constructed as described above is charged in the deck, so that the release pin of the deck is inserted into the casing to upward move the release member against the spring. This causes the reel brakes to be pivotally moved through the operation cam section operatively connected to the release member, to thereby be released from the teeth of the reels, resulting in the reels being rendered rotatable.

When the tape cassette is removed from the deck, the release pin is disengaged from the tape cassette, so that the spring causes the release member to be downward moved. This causes the reel brakes to be resiliently pivotally moved, to thereby be engaged with the teeth of the reels to regulate rotation of the reels, so that the tape may be kept tight.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
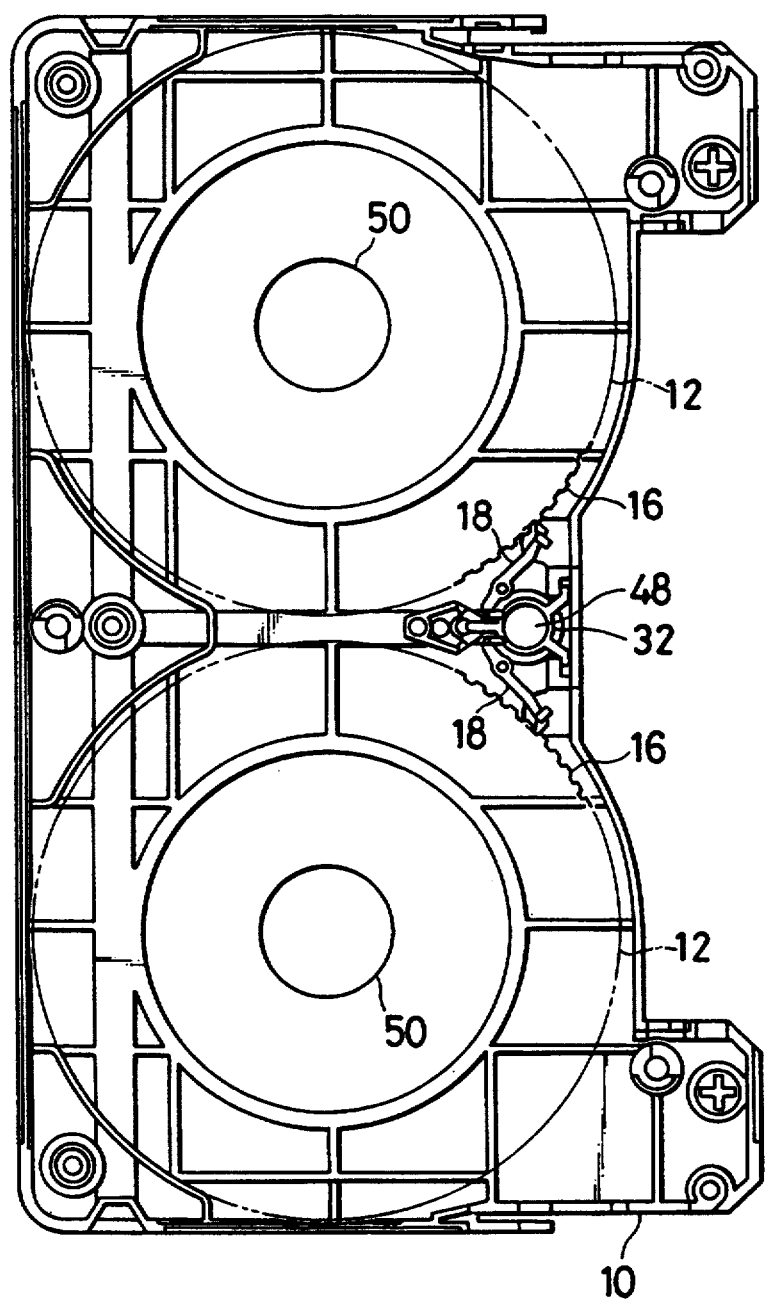
FIG. 1 is a plan view showing a cassette casing of an embodiment of a tape cassette according to the present invention.
Figure 2:
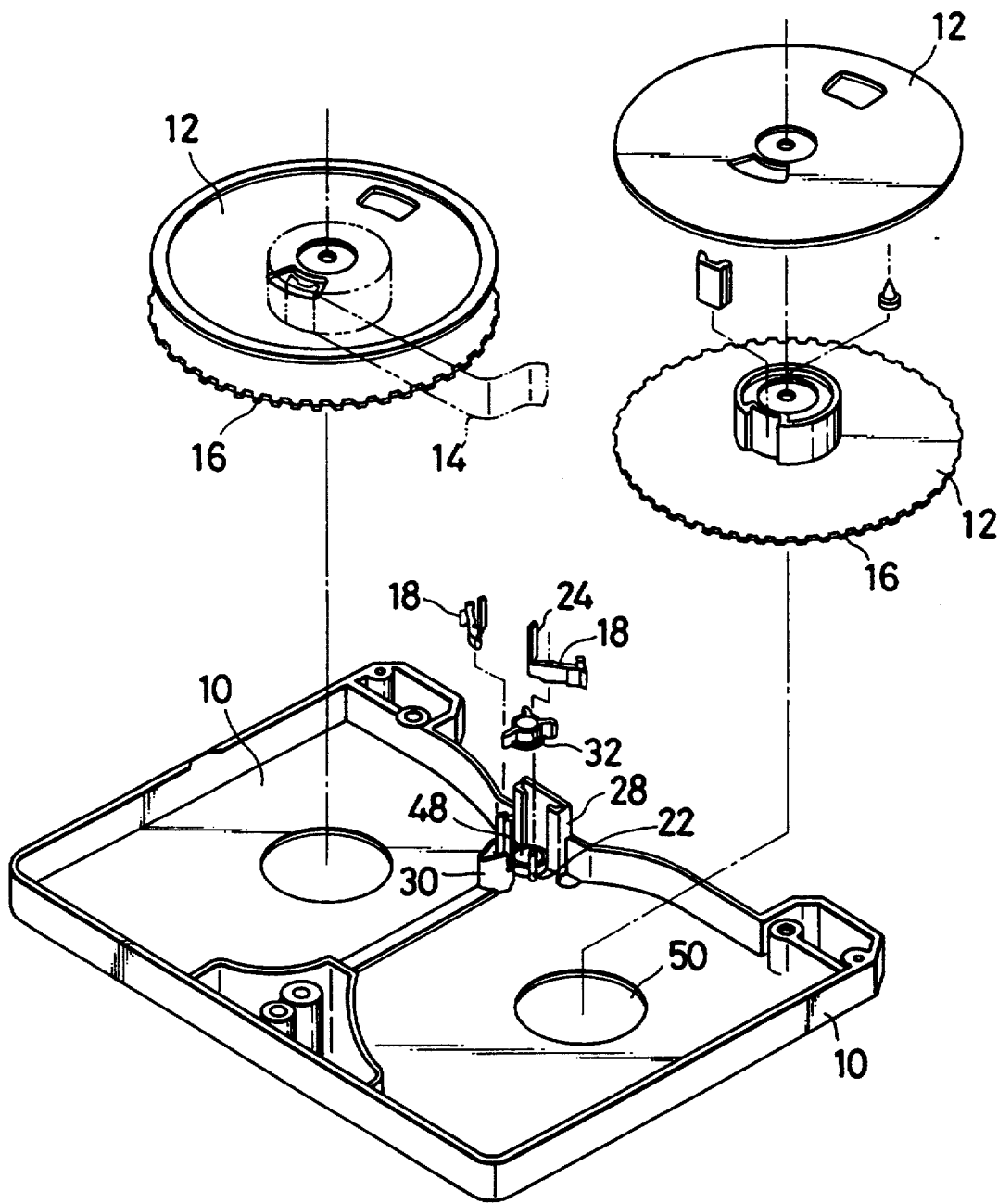
FIG. 2 is an exploded perspective view of the embodiment shown in FIG. 1 wherein an upper casing member is deleted for the sake of brevity.

Now, a tape cassette according to the present invention will be described hereinafter with reference to the accompanying drawings.

FIG. 1 to 5C illustrate an embodiment of a tape cassette according to the present invention. A tape cassette of the illustrated embodiment includes a casing 10, in which a pair of reels 12 are arranged in a manner to be rotatable therein. On the reels 12 is wound a tape 14 such as a magnetic tape in a manner to extend between the reels so as to pass back and forth. The reels 12 each are provided with teeth 16. In the illustrated embodiment, the teeth 16 are arranged on an outer periphery of each of the reels 12. Also, the tape cassette includes a pair of reel brakes 18 each constantly forced by a spring 20 (FIG. 4A) and actuated so as to be selectively engaged with the teeth 16 of the reel 12 as described below. For this purpose, each of the reels brakes 18 is provided at one end thereof with a pawl 21 adapted to be engaged with the teeth 16 of the reel 12. The reel brakes 18 each are rotatably held on each of support shafts 22 mounted in the casing 10 and provided at the other end thereof with an operating cam section 24. In the illustrated embodiment, the operating cam section 24 is formed integral with the reel brake 18. Also, the reel brakes 18 each are arranged so as to be moved vertically or reciprocatively in a direction parallel with an axis of the support shaft 22, preferably, along a guide means which may comprise guides 28 and 30. Further, the tape cassette of the illustrated embodiment includes a release member or release lever 32 urged by a spring 34 and abutted against the operating cam section 24 so as to be operatively connected thereto. The spring 34 may comprise a coiled spring.

Figure 3:
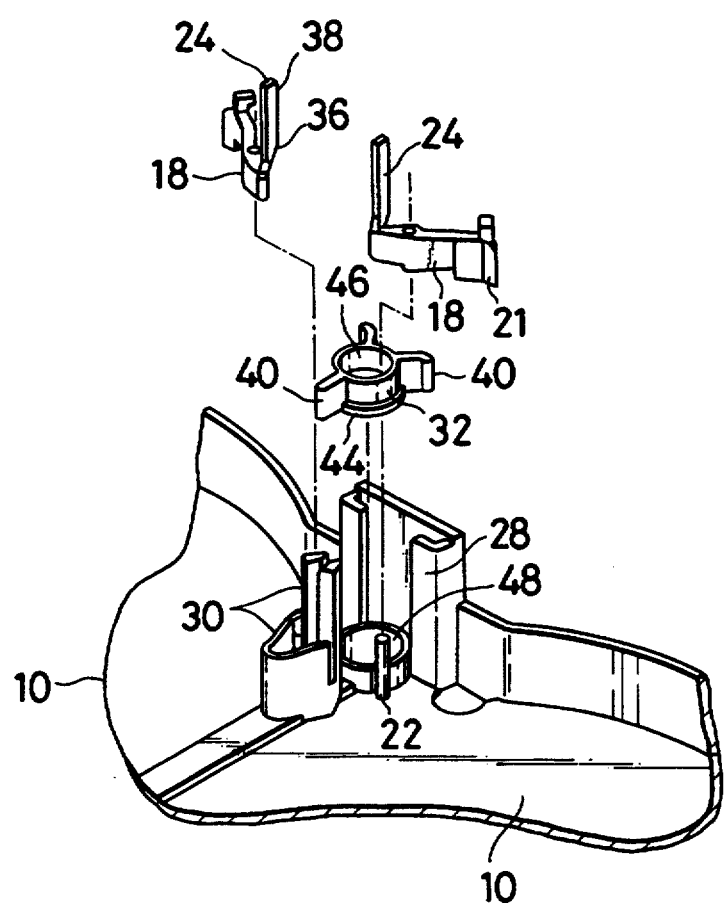
FIG. 3 is a fragmentary exploded enlarged perspective view showing a brake mechanism.

As described above, the reel brakes 18 each are pivotally mounted on the support shaft 22 and provided at one end thereof with the pawl 21 adapted to be engaged with teeth 16 of the reel 12 and at the other end thereof with the operating cam section 24. In the illustrated embodiment, the operating cam section 24 comprises a rib which is formed at the other end of the reel brake 18 so as to upward extend therefrom. More particularly, the rib for the operating cam section 24, as shown in FIG. 3, is formed so as to have an outer side end or edge which comprises a slanting portion 36 formed in a manner to upwardly extend from the other end of the reel brake 18 and downwardly inwardly or upwardly outwardly slant and a vertically extending portion 38 formed so as to vertically upwardly extend from an upper end of the slanting portion 36 without slanting. The so-formed outer side end of each of the ribs, which serves as a cam surface, is engaged with the release lever 32 as described below.

In the illustrated embodiment, the guides 28 and 30 provided for guiding vertical movement of the release lever 32 each comprise a wall member which may be formed using a wall arranged in the casing or a wall of the casing 10. Alternatively, the guides each may comprise a rod or shaft vertically provided in the casing 10. For example, the rods or shafts for the guides 28 and 30 may be arranged at suitable intervals around the release lever 32. The release lever 32 may be provided on an outer periphery thereof with guide ribs 40 in a manner to be spaced at suitable intervals and radially extend; and, in this instance, the rods for the guides 28 and 30 may be arranged opposite to each other so as to interpose each of the guide ribs 40 therebetween. Alternatively, in this instance, the guide walls for the guides each may be formed so as to define a guide groove therein which acts to guide each of the guide ribs 40. Alternatively, the release lever 32 may be formed with apertures in place of the guide ribs 40, through which the rods for the guides 28 and 30 are inserted so as to permit the release lever 32 to be vertically guided along the rods.

Further, in the illustrated embodiment, the release lever 32 comprises a hollow cylinder and, as described above, is radially provided on the periphery thereof with a plurality of the guide ribs 40 so as to radially extend and be associated with the grooves defined by the guides 28 and 30 or the rods. In the illustrated embodiment, three or more such guide ribs 40 are arranged on the periphery of the release lever 32 and slidably fitted with respect to the grooves of the guides 28 and 30 or the rods. The release lever 32 is preferably constructed so as to have a lower surface section 42 against which a release pin 26 provided on the side of a deck or recorder/reproducer for driving or operating the tape cassette is abutted, a flange section 44 against which the reel brakes 18 are abutted and a hollow cylindrical section 46, and the coiled spring 34 is fittedly arranged in the cylindrical section 46 to urge the release lever 32 toward the side of the lower surface section 42 or in the downward direction in FIGS. 4B and 4C.

The release pin 26 of the deck is inserted through an insertion hole 48 formed at the casing 10 into the casing. For the release pin 26 may be conveniently used a detector (light emitter) of the lighthouse type which may be inserted into the casing 10 for detecting a terminal end of the magnetic tape. The release lever 32 is arranged opposite to the insertion hole 48 and the coiled spring 34 is arranged so as to be interposed between an upper wall of the casing 10 and its lower wall.

In the drawings, reference numeral 50 designates a hub hole.

Figure 4A:
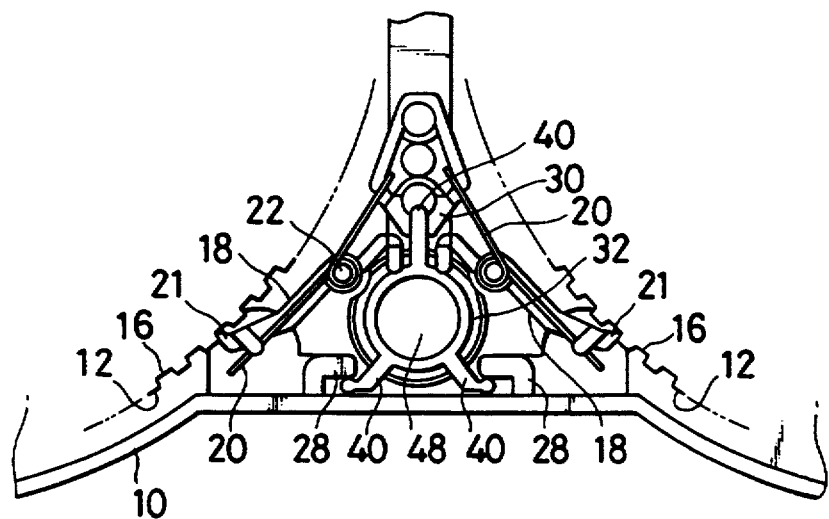
FIG. 4A is a fragmentary plan view showing the relationship between reel brakes and reels wherein the reel brakes are engaged with teeth of the reels to prevent rotation of the reels.
Figure 4B:
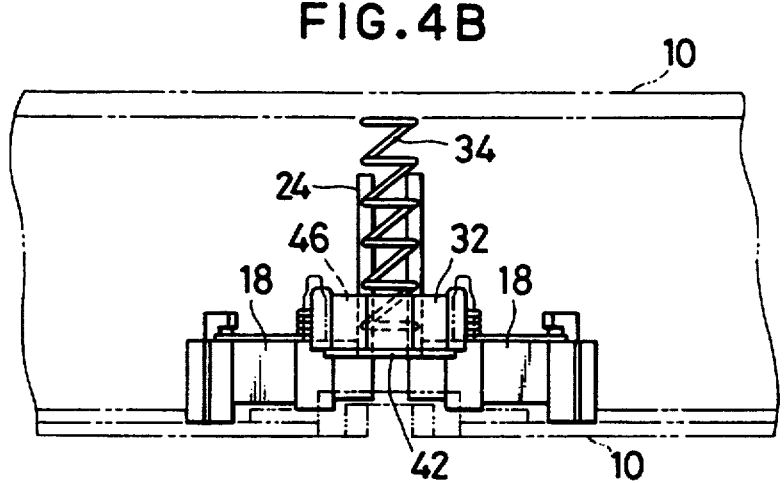
FIG. 4B is a fragmentary front elevation view of the relationship shown in FIG. 4A wherein the casing is indicated in phantom lines.
Figure 4C:
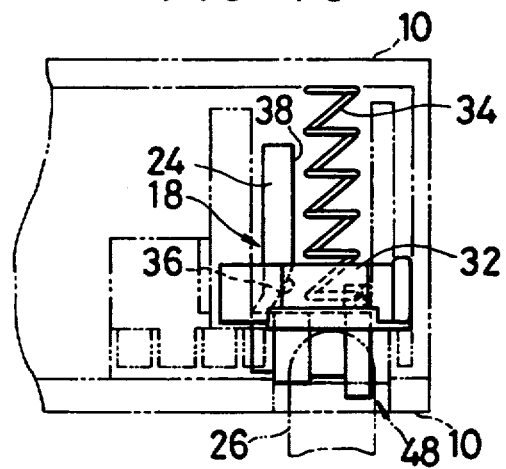
FIG. 4C is a fragmentary side elevation view of the relationship shown in FIG. 4A wherein the casing is indicated in phantom lines.
Figure 5A:
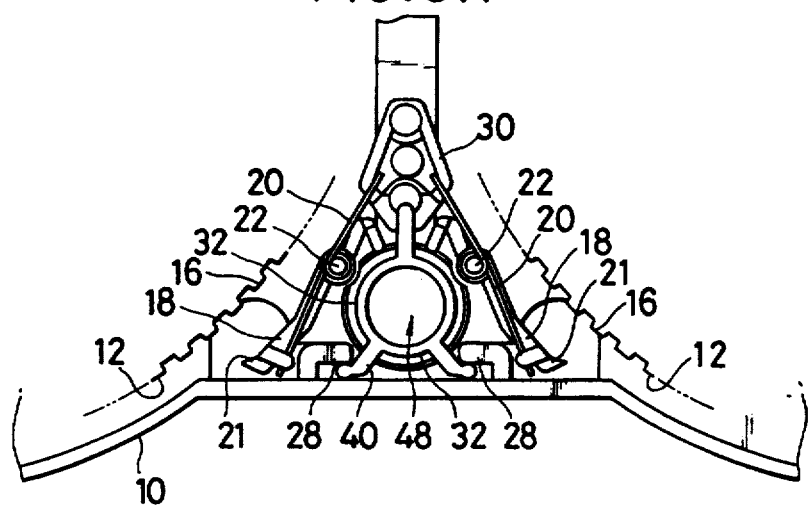
FIG. 5A is a fragmentary plan view similar to FIG. 4A wherein reel brakes are released from engagement with teeth of the reels to render the reels rotatable.
Figure 5B:
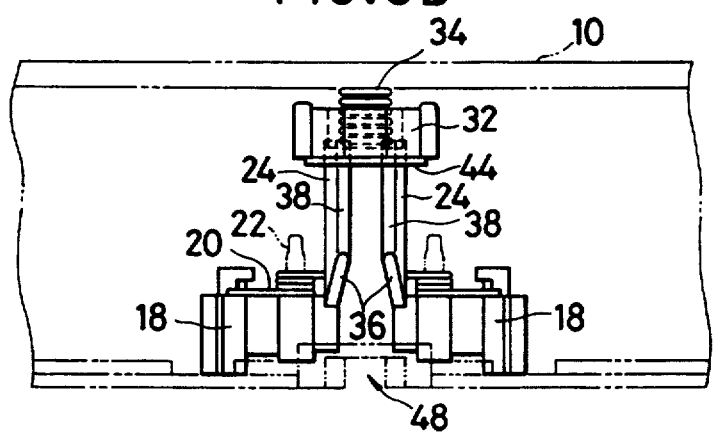
FIG. 5B is a fragmentary front elevation view of the relationship shown in FIG. 5A wherein the casing is indicated in phantom lines.
Figure 5C:
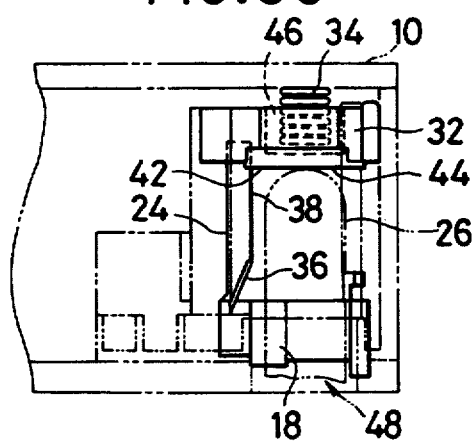
FIG. 5C is a fragmentary side elevation view of the relationship shown in FIG. 5A wherein the casing is indicated in phantom lines.

Now, the manner of operation of the tape cassette constructed as described above will be described hereinafter with reference to FIGS. 5A to 5C as well as FIGS. 4A to 4C.

When the tape cassette is charged in the deck, the release pin 26 forces upward the release lever 32 through the insertion hole 48 against the spring 34. This causes the release lever 32 to be moved upward while being pressed against the slanting portion 36 of the operating cam section 24 provided on one end of each of the reels brakes 18, so that the reel brakes 18 each are pivotally moved about the support shaft 22 to release the pawl 21 provided at the other end of the reel brake 18 from the teeth 16 of the reel 12 to render the reel brake 18 free, resulting in the reels 12 being rotatable. Then, the release lever 32 is forced further upward, resulting in being moved further upward; however, the release lever 32 is moved while being kept contact with the vertically extending portion 38 of the operating cam section 24, to thereby prevent further pivotal movement of each of the reel brakes 18, so that the reel brakes 18 are kept stationary at a position released from the reels.

Thus, when the release lever 32 is vertically moved, it causes pivotal movement of the reel brakes 18 only in the case that the release lever 32 contacts with the slanting portion 36 of the operating cam section 24 of each of the reel brakes 18; and when the release lever 32 contacts with the vertically extending portion 38, the reel brakes 18 are kept stationary irrespective of further movement of the release lever 32, resulting in further pivotal movement of the reel brakes 18 being prevented.

As can be seen from the foregoing, the tape cassette of the present invention is so constructed that the release member is vertically movably arranged in the casing and forced downward by the spring means and the operating cam sections are pressed against the release member to be operatively associated with the release member, whereby the release pin provided on the side of the deck for driving or operating the tape cassette is upwardly abutted against the release member. Such construction of the present invention permits slight rectilinear movement of the release member to increase pivotal movement of the reel brakes and prevents excessive or extra pivotal movement of the reel brakes after the required pivotal movement of the reel brakes is accomplished. Thus, the present invention permits the brake mechanism to be set in a narrow area or region and still exhibit an effective and stable braking function. Also, the brake mechanism described above permits changing-over of the reel brakes from the pivoting state to the stationary state to be effectively carried out even when the vertical movement of the release member is increased, so that the reel brakes may attain pivotal movement within a narrow region while exhibiting a satisfactory-braking action. Further, the above-described construction of the present invention facilitates assembling and manufacturing of the tape cassette.

While a preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A tape cassette comprising:
   a casing;
   a pair of reels rotatably arranged in said casing and having a tape wound thereon so as to extend therebetween;
   said reels each being formed with teeth;
   reel brakes pivotally arranged in said casing and associated with said teeth of said reels to regulate rotation of said reels;
   said reel brakes each being formed at one end thereof with an operating cam section, including a rib formed on each of said reel brakes so as to vertically extend therefrom;
   a release member vertically and movably arranged in said casing and downward and resiliently forced, the vertical movement being coextensive with an operative contact with said vertical rib;
   the release member including a circular outer periphery;
   said operating cam sections being pressed against said release member so as to be operatively associated with said release member;
   whereby a release pin provided on a side of a deck is upwardly abutted against said release member, wherein each said rib includes an outer side end engaged with the circular outer periphery of said release member; and
   each said outer side end comprises a slanting portion formed so as to downwardly inwardly slant and a vertically extending portion connected to said slanting portion.

2. A tape cassette as defined in claim 1, further comprising guide means arranged in said casing for guiding vertical movement of said release member.

3. A tape cassette as defined in claim 2, wherein said release member includes a surface section against which an upper end of said release pin is abutted, a plurality of guide ribs provided on an outer periphery thereof in a manner to radially extend, and a cylindrical section;
   said guide ribs being engaged with said guide means to permit said release member to vertically move along said guide means;
   said cylindrical section having a coiled spring fitted therein so as to force said release member toward said surface section.

4. A tape cassette as defined in claim 3, wherein said guide means comprises grooves provided in said casing.

5. A tape cassette as defined in claim 4, wherein said grooves are each defined by a wall member.

6. A tape cassette as defined in claim 3, wherein said guide means comprises rods provided in said casing.

7. A tape cassette as defined in claim 1, wherein said release member includes a surface section against which an upper end of said release pin is abutted, a flange section against which each said outer side end of each said rib is abutted and a cylindrical section having a coiled spring fitted therein so as to force said release member toward said surface section.

8. A tape cassette comprising:
   a casing;
   a pair of reels rotatably arranged in said casing and formed with teeth;

a tape arranged between said pair of reels to pass back and forth to be wound thereon;

reel brakes each pivotally supported by a shaft and each having an engaging portion engageable with said teeth at one end thereof;

a brake release member reciprocatively movable in a direction parallel with an axis of each said shaft and being moved by an operating member provided on a recorder/reproducer, said brake release member including a cylindrical body, a plurality of guide ribs radially extending from said cylindrical body and a cam flange member having a circular outer periphery;

guide means in said casing for engaging said guide ribs to enable a controlled reciprocative movement; and transmitting means for transmitting the rectilinear motion of said brake release member to each of said reel brakes to rotate each of said reel brakes about each of said shafts including a cam member mounted at the other end of each reel brake from the engaging portion, the cam member extending a substantial traverse distance above the teeth on a reel to maintain operative contact with the circular outer periphery of the cam flange member of said brake release member as it reciprocates within the casing.

9. A tape cassette as defined in claim 8, wherein said transmitting means comprises means for converting the rectilinear motion of said brake release member which moves a predetermined distance to each of said reel brakes to rotate each of said reel brakes and keeping each of said reel brakes stationary at a position released from said teeth while said brake release member moves beyond the predetermined distance.

10. A tape cassette as defined in claim 9, wherein said transmitting means includes a slanting portion.

11. A tape cassette as defined in claim 9, wherein said cam member comprises a cam surface, which is provided on each of said reel brakes, formed of a first surface portion parallel with said axis and a second surface portion slanted with respect to said axis and said cam flange member defined by an outer surface of said brake release member and presses against said cam surface.

12. A tape cassette comprising:

a casing having an upper and a lower surface;

a pair of reels rotatably arranged within said casing and capable of supporting a tape for operative movement;

a pair of reel brake members, pivotally mounted in the casing, each movably mounted in the casing for respective engagement and disengagement with one of the reels, each reel brake member having a pawl member mounted at one end for engagement with a reel and a cam member mounted at the other end and extending substantially across the distance between the upper and lower surfaces, each reel brake member having an L-shaped configuration with the cam member extending upward from the pawl member;

a brake release member having a circular outer periphery in contact with the reel brake members and reciprocatively movable in a direction extending traverse to the upper and lower surfaces, the brake release member further including at least three guide ribs jointly within the upper and lower surfaces to define the traverse movement; and means for mounting the reel brake members in the casing, including guide members that enable a movement wherein the reel brake members can move relative to the reels when they are moved relative to the upper and lower surfaces of the casing, whereby the tape can be enabled for operative movement or held stationary by disengagement or engagement of the reel brake members with the reels.

13. A tape cassette as set forth in claim 12 wherein the pair of reel brake members are spring biased towards a lower surface of the casing.

14. A tape cassette as set forth in claim 12 wherein the pair of reel brake members are spring biased towards the reels when adjacent the lower surfaces of the casing.

15. A tape cassette as set forth in claim 12 further including a separate helical spring member for each reel brake to bias each reel brake independently against a reel.

* * * * *